US007274285B2

(12) United States Patent
Chaloner et al.

(10) Patent No.: US 7,274,285 B2
(45) Date of Patent: Sep. 25, 2007

(54) SYSTEM AND METHOD FOR IMPROVED OBJECT IDENTIFICATION

(75) Inventors: Michael J. Chaloner, Newport (GB); Richard Lynn Gardner, Jr., Greeley, CO (US); Paul C. Coffin, Fort Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1158 days.

(21) Appl. No.: 09/912,211

(22) Filed: Jul. 24, 2001

(65) Prior Publication Data

US 2003/0206095 A1 Nov. 6, 2003

(51) Int. Cl.
*H04Q 5/22* (2006.01)

(52) U.S. Cl. ................ 340/10.4; 340/10.1; 340/10.41; 340/3.51; 340/505; 340/572.1; 340/572.5; 340/572.9; 340/825.69; 340/825.72; 235/375; 235/386

(58) Field of Classification Search .............. 340/10.4, 340/572.4, 572.5, 572.7, 572.9, 825.49, 10.1, 340/10.41, 3.51, 505, 572.1, 825.69, 825.72; 235/375, 386

See application file for complete search history.

(56) References Cited

U.S. PATENT DOCUMENTS 3,737,911 A 6/1973 Sakuragi et al.
4,476,469 A * 10/1984 Lander .................. 340/825.49
5,446,447 A * 8/1995 Carney et al. .............. 340/572
5,574,665 A 11/1996 Narasimhan
5,581,257 A * 12/1996 Greene et al. ................ 342/51
5,822,714 A 10/1998 Cato
5,963,134 A * 10/1999 Bowers et al. ........... 340/572.1
5,995,019 A * 11/1999 Chieu et al. ............. 340/10.32
6,104,311 A * 8/2000 Lastinger ............... 340/825.54
6,204,764 B1 * 3/2001 Maloney .................. 340/568.1
6,600,418 B2 * 7/2003 Francis et al. ........... 340/572.1

FOREIGN PATENT DOCUMENTS

| | | | |
|---|---|---|---|
| EP | 0405695 | A | 1/1991 |
| EP | 0556910 | A | 8/1993 |
| WO | WO99/33017 | A | 7/1999 |
| WO | WO 00/10122 | A | 2/2000 |

* cited by examiner

*Primary Examiner*—Brian Zimmerman
*Assistant Examiner*—Vernal Brown
(74) *Attorney, Agent, or Firm*—Fulbright & Jaworski LLP

(57) ABSTRACT

A method for identifying objects within a set of objects includes the steps of transmitting a signal toward a region of interest, receiving energy reflected from the region of interest, establishing a baseline field strength for the received reflected energy, determining at least one frequency at which the field strength substantially differs from the baseline field strength for the received reflected energy, and identifying at least one object within the region of interest based upon the determined at least one frequency.

17 Claims, 3 Drawing Sheets

*FIG. 2*
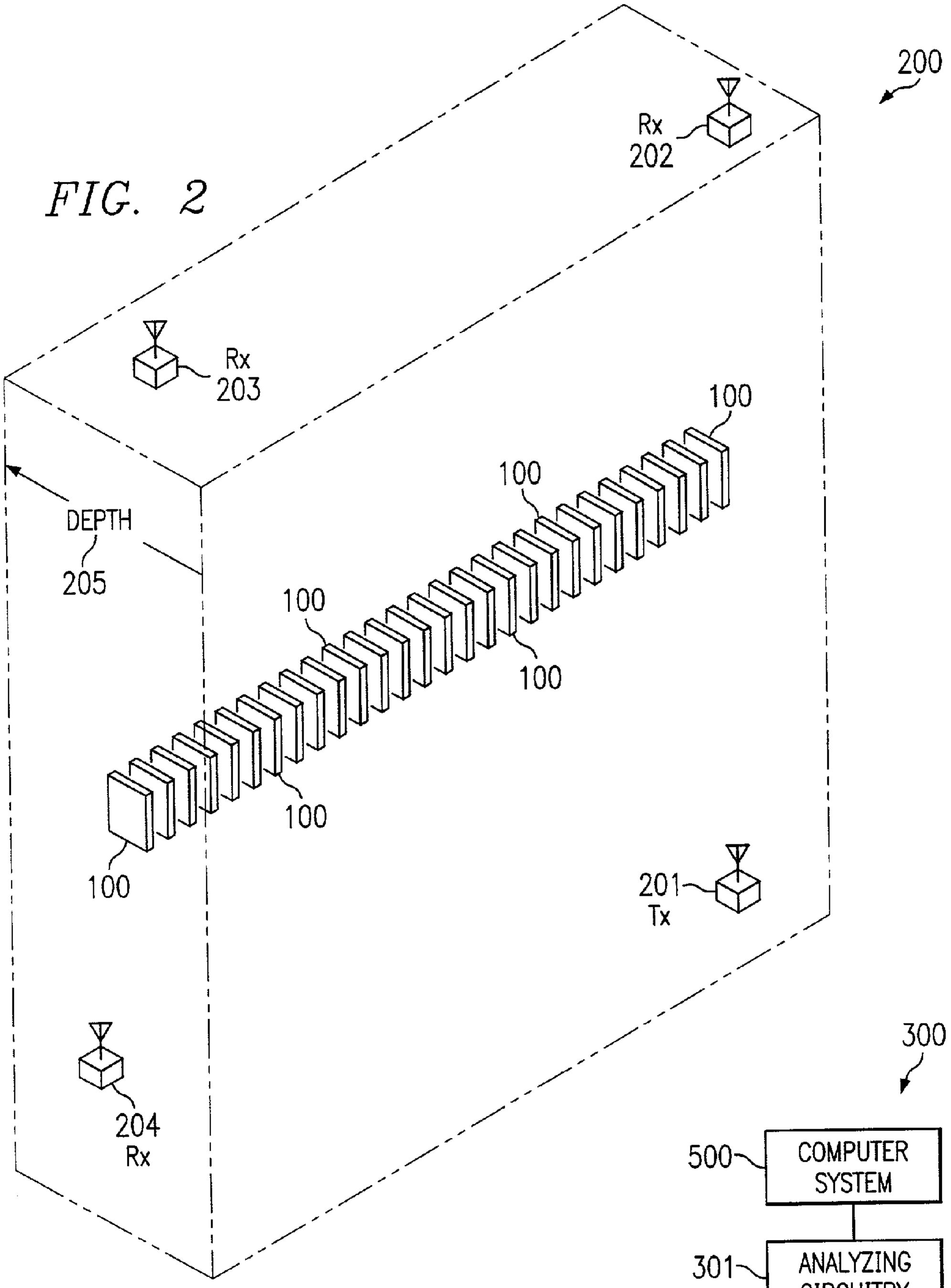
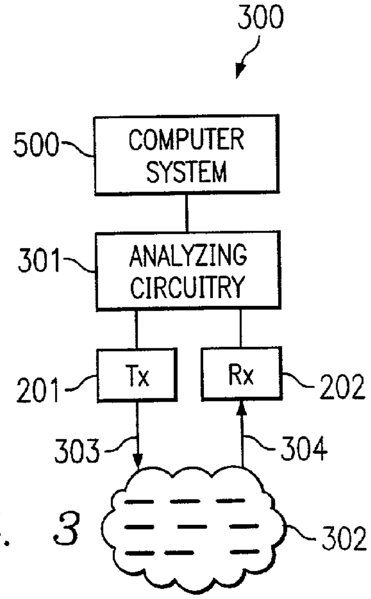
*FIG. 3*

SYSTEM AND METHOD FOR IMPROVED OBJECT IDENTIFICATION

TECHNICAL FIELD

The present invention relates in general to object identification and in particular to systems and methods for object identification and object presence detection.

BACKGROUND

When storing distinguishable objects, such as tape cartridges, within a defined area, in which various object removal and replacement opportunities exist, it is generally desirable to provide a mechanism for identifying those objects present within the defined area.

One approach to providing the desired object identification is to attach bar codes to each of the objects and to subsequently read these bar codes when an object presence/absence determination is sought. Since bar codes are generally read by a reader placed in substantial proximity to a bar code imprint or sticker, a mechanism for moving a bar code reader into a suitable reading position is generally needed. For example, in a tape library container, where individual tape cartridges are affixed with bar codes for later identification, a robot arm may be employed to move a bar code reader into position to read bar codes disposed on individual tape cartridges. While this approach may succeed in identifying the tape cartridges within a defined area, such as a tape cartridge container, equipment, such as the robot arm, and appropriate engineering, such as robot arm programming, will generally be needed in order to make such a system operational. Moreover, considerable time may be expended moving the robot arm to various reading locations in order to complete one full presence detection operation. Furthermore, the available locations in which objects may be stored in a container may be limited by the need to gain line-of-sight access to a bar code by a mobile bar code reader.

Another approach to providing object presence/absence detection is to equip objects, whose presence information is sought, with a computer chip able to intelligently communicate with an appropriately located controller or computer. This approach would generally provide each equipped object with the ability to intelligently transmit and receive a broad range of information over a connection to a central controller. While this approach would provide a central controller with the ability to perform object presence detection, this solution generally represents an unnecessarily elaborate, complicated, and expensive approach to a relatively simple communication function.

SUMMARY OF THE INVENTION

The present invention is directed to a method for identifying objects within a set of objects, the method comprising the steps of transmitting a signal toward a region of interest, receiving energy reflected from said region of interest, establishing a baseline field strength for said received reflected energy, determining at least one frequency at which said field strength substantially differs from said baseline field strength for said received reflected energy, and identifying at least one object within said region of interest based upon said determined at least one frequency.

The present invention is also directed to a system for detecting objects within at least one region of interest, wherein the system preferably comprises object detection equipment disposed conveniently to a region of interest, a set of objects for detection by the object detection equipment, and at least one antenna disposed on each object for uniquely identifying this antenna-equipped object to the object detection equipment.

The present invention is also directed to a system for detecting object presence, the system comprising means for transmitting RF (radio frequency) energy towards objects in a region of interest, means for receiving RF energy from said objects in said region of interest, means for generating at least one resonant frequency to represent an object population in said region of interest, means for altering said received RF energy with said generated at least one resonant frequency, and means for analyzing said altered received RF energy.

BRIEF DESCRIPTION OF THE DRAWING

FIG. 2 is a perspective view of a container suitable for holding a plurality of tape cartridges according to a preferred embodiment of the present invention;

FIG. 3 is a block diagram of an inventory system segment according to a preferred embodiment of the present invention;

DETAILED DESCRIPTION

Figure 1A:
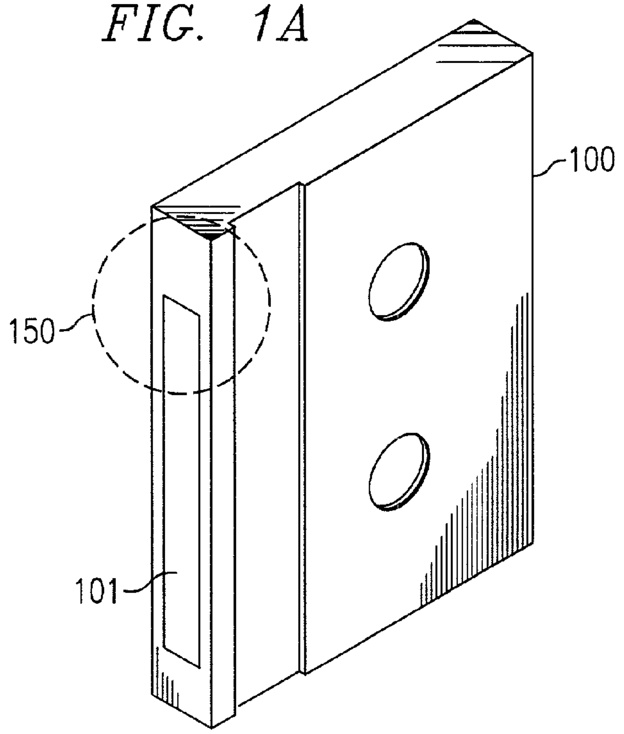
FIG. 1A is a perspective view of a tape cartridge having a resonant antenna according to a preferred embodiment of the present invention.

The present invention is directed to a system and method which employs a wireless communication mechanism to identify objects present within a region of interest. Preferably, a radio frequency (RF) signal is transmitted from a selected location in proximity to a region of interest, such as a container or tape library, and impinges upon strips of material disposed on each of the objects located within the region of interest. The material strips are preferably sized so as to cause the strips to have distinctive resonant frequencies, thereby providing a mechanism for uniquely identifying the objects within a region of interest based upon reflected energy received at an appropriately located receiver. The field strength of a frequency at a receiver may be either increased or decreased by the presence of an antenna. Thus, the inventive mechanism preferably detects lower or higher than expected field strengths for one or more frequencies within a frequency spectrum under examination.

While the above discussion is directed to a system employing RF energy transmission, it will be appreciated that energy transmission in other frequency ranges may be employed, and all such variations are included within the scope of the present invention. Such other frequency ranges include but are not limited to: sonic and ultrasonic. Moreover, while dimension was mentioned as one characteristic of the resonant material which could be varied to implement unique identification of each object within a system, it will be appreciated that other characteristics of the resonant material could be varied to achieve the desired unique identification. Resonant material characteristics which could be varied include but are not limited to: length, width, thickness, material composition, electrical resistance, electrical excitation, application of tensile force, application of compressive force, temperature, electrical induction, and electrical capacitance.

Existing in-store theft protection systems have employed transmitters and receivers to trigger an alarm upon detecting an attempted unauthorized removal of an item from a secured area. Such systems typically employ a transmitter, a receiver suitably matched to the receiver, and resonant antennae appropriately deployed on objects to be protected from theft or other unauthorized movement. However, since all protected items are detected by employing the same detection frequency, there is no reason to deploy antennae having different dimensions and thereby different resonant frequencies. Store theft protection systems generally operate to determine whether any protected item is being impermissibly moved past a particular checkpoint. Distinguishing between different protected items is neither necessary nor beneficial because the same warning condition should logically be triggered whenever any such protected item is being impermissibly moved. Thus, uniquely identifying the protected items provides no benefit to a theft protection system. Thus, such theft protection systems therefore do not provide any motivation to employ antennae having varying resonant frequencies on different items within a secured area.

Therefore, it is an advantage of a preferred embodiment of the present invention that the inventive mechanism provides a rapid and simple method for identifying a population of objects present within a region of interest.

It is a further advantage of a preferred embodiment of the present invention that object presence detection may be practiced without a need for complex mechanical equipment to position data acquisition devices or to be disposed on each object to be identified.

Figure 1B:
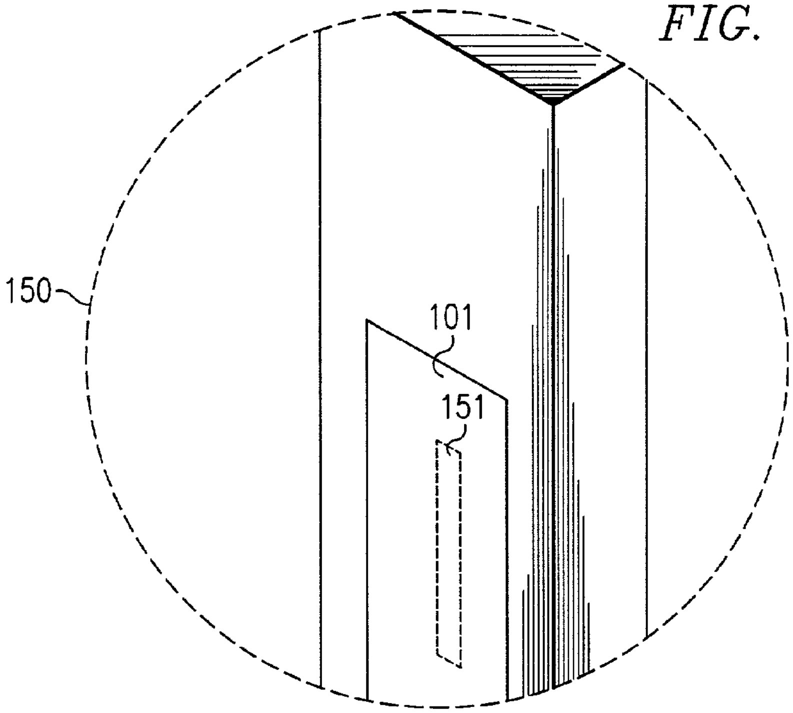
FIG. 1B is an enlarged perspective view of a portion of the tape cartridge depicted in FIG. 1A.

FIG. 1A is a perspective view of a tape cartridge 100 having a resonant antenna according to a preferred embodiment of the present invention. FIG. 1B is an enlarged perspective view of a portion of the tape cartridge depicted in FIG. 1A.

In a preferred embodiment, label 101 is affixed to tape cartridge (or other object) 100 to which an antenna 151 may in turn be readily attached. Antenna 151 may be a printed area of conducting ink, a metal antenna, or metal strip in any one of a number of configurations. Regardless of the configuration of antenna 151, its dimensions are preferably strategically selected and accurately implemented so as to ensure that each antenna resonates at its own pre-selected frequency. When establishing an arrangement for a plurality of objects to be identified, the various antennae 151 are preferably dimensioned, or otherwise uniquely configured, so as to all resonate at different frequencies. In this manner, all objects within a particular inventory system are preferably uniquely identifiable.

In a preferred embodiment, the length of each antenna 151 is established so as to resonate at a pre-selected frequency. However, other dimensions and/or characteristics of a set of antennae may be varied so that no two of the antennae within the pertinent set of antennae have the same resonant frequency. One additional desirable design constraint is to avoid having any one antenna resonate at a frequency which is a harmonic of any other antenna's resonant frequency. A harmonic of this sort could cause a computer interpreting incoming data to misinterpret a harmonic of one antenna to be the resonant frequency associated with another antenna.

In a preferred embodiment, various standard means may be employed to manufacture the antennae. For example, where conductive ink antennae are employed, printers may be modified to use conductive ink in place of standard ink.

While the instant discussion is directed to the identification of tape cartridges, it will be appreciated that the inventive principles disclosed herein are applicable to a wide range of objects for identification within an inventorying system and suitable for storage and detection within specific regions of interest, such as for instance, tape libraries. It will be appreciated that the disclosed system and method for identifying tape cartridges is but one possible embodiment of the present invention.

The inventive mechanism is preferably able to provide both a total count of objects within a region of interest as well as a specific identification of each particular object. Moreover, while the instant discussion is primarily directed toward the identification of objects of the same type but with unique identification, the present invention is applicable to the identification of objects of varying type stored within a single region of interest, such as for instance, a tape cartridge and a compact disk container stored within a common storage unit.

FIG. 2 is a perspective view of a container 200 suitable for holding a plurality of tape cartridges 100 according to a preferred embodiment of the present invention. Where the objects being stored are tape cartridges 100, container 200 is preferably a metal cabinet or tape library for storage of such tape cartridges. A series of tape cartridges 100 is shown disposed within container 200. It will be appreciated that the linear array of tape cartridges is but one possible geometric configuration in which such tape cartridges may be stored within container 100. The inventive object presence detection mechanism does not limit the available geometric configurations of object storage arrangements within container 200. Accordingly, a plurality of rows and/or columns may be employed. Moreover, a plurality of arrays of objects may be stored within container 200, displaced from one another along the "depth" dimension 205 of container 200. Such configurations are enabled by the present invention because the object identification communication mechanism of the present invention does not require that objects be located in a manner so as to be accessible by a bar code reader.

In a preferred embodiment, container 200 is made of metal and thereby operates to insulate its own interior from extraneous frequencies which could disrupt the proper interpretation of RF energy reflected back to receivers 202-204. In this case, the interior of container 200 operates as the relevant region of interest within which a system according to the present invention conducts object presence detection.

In a preferred embodiment, Tx (transmitter) 201 transmits RF signal energy throughout container 200. Receivers (Rx) 202-204 are preferably placed in various locations within container 200 to receive RF energy reflected from objects, which may be tape cartridges 100, disposed within container 200. Although three receivers 202-204 are shown in FIG. 2, it will be appreciated that fewer or more than three receivers may be employed. Likewise, although only one transmitter is shown in FIG. 2, it will be appreciated that any number of transmitters could be deployed. Moreover, the transmitters and receivers could either be separate entities, as shown in FIG. 2, or combined into transceivers. In yet another alternative embodiment, a combination of receivers, transmitters, and transceivers may be employed, and all such variations are included within the scope of the present invention.

Herein, a region of interest generally corresponds to a region for which object presence information is sought and object presence detection conducted. Other than when objects have been destroyed, it follows that all objects ever labeled and associated with a particular frequency are present somewhere. The role of the inventive object presence detection mechanism, however, is preferably to determine object presence detection within a particular region, known herein as the "region of interest." The interior of container 200 is one example of such a region of interest. However, it will be appreciated that numerous alternative configurations of such a region of interest could be employed, and all such variations are included within the scope of the present invention.

A region of interest need not necessarily have defined physical boundaries such as those included within preferably metal container 200. For example, where a tool kit includes drill bits and other implements which have been associated with unique frequencies, a transmitter could beneficially check to see whether a selected group of such drill bits is present in a work area in proximity to a particular drill or other tool. This work area need not necessarily be bounded by metal or other mechanical barriers. Such a drill bit detection mechanism could simply operate to detect whether particular tools are within the RF transmission and reception ranges of the transmitters and receivers, respectively, employed in that particular object detection scheme.

Herein, an inventorying system, or inventory system, generally includes at least one region of interest and one full set of objects wherein each object is assigned a unique frequency and fitted with an antenna resonant at this assigned frequency for detection thereof by appropriate frequency analysis equipment. With such an arrangement, all objects within a set of objects recognizable to an object detection system would present a unique frequency signature and would thus all be distinguishable from all other objects within the full set of objects.

Preferably, each region of interest is equipped with at least one transmitter for emitting RF signal energy and at least one receiver for receiving RF energy which is preferably modified by the presence of resonant antennae disposed within that receiver's region of interest. A plurality of regions of interest, each having associated transmitters, receivers, analyzing circuitry, and data processing equipment may be employed in connection with a single inventory system which employs a uniform association of resonant frequencies with specific objects or components.

Figure 6:
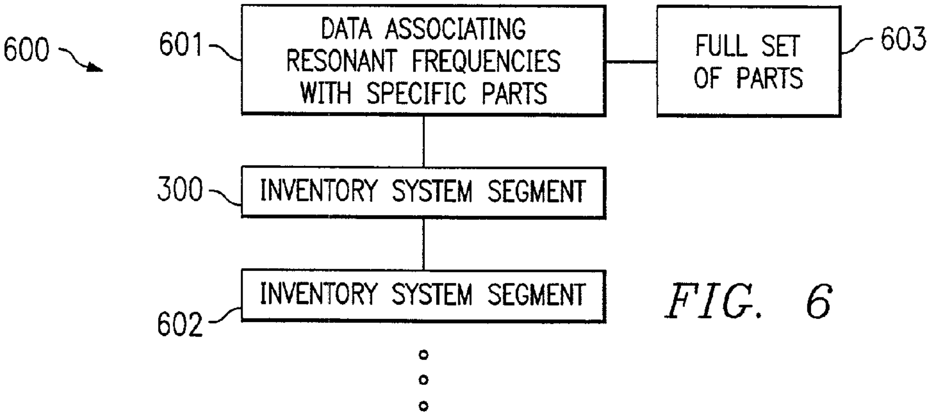
FIG. 6 depicts an inventory system according to a preferred embodiment of the present invention.

With reference to FIG. 6, employing this approach, a plurality of different regions of interest 300, 602 forming part of a single inventory system 600 could operate substantially independently of one another while still employing a common source of data associating resonant frequencies with specific objects 601. In this manner, duplicate and/or ambiguous identification of object presence may be avoided, and object presence detection data from different inventory system segments may optionally be combined in order to present comprehensive object location data for entire inventory system. Full set of objects 603 generally corresponds to all objects recognizable to inventory system 600 and associated with identifying frequencies in data table 601.

In an alternative embodiment, where certain groups of objects within a full set of objects are interchangeable, objects within such a group could be assigned the same frequency without departing from the inventive principles disclosed herein. Employing such an alternative embodiment, the inventive system could still distinguish an object within a group of like objects from any other object within the full set but would not be able to distinguish between objects within a group of like objects.

FIG. 3 is a block diagram of an inventory system segment according to a preferred embodiment of the present invention. Preferably, Tx 201 transmits RF signal energy 303 toward objects disposed within region of interest 302. The frequency spectra of energy reflected 304 from objects within region of interest 302 preferably reflect the presence of carefully tuned antennae affixed to objects within region of interest 302. At any given moment, region of interest 302 may contain all objects recognizable to analyzing circuitry 301, or a subset of this set of objects.

In a preferred embodiment, analyzing circuitry 301, optionally in cooperation with computer system 500, is employed to process reflected RF signal energy 304 and to identify specific frequencies at which resonance occurs within region of interest 302 and thereby determine which objects are present within region of interest 302.

Figure 4:
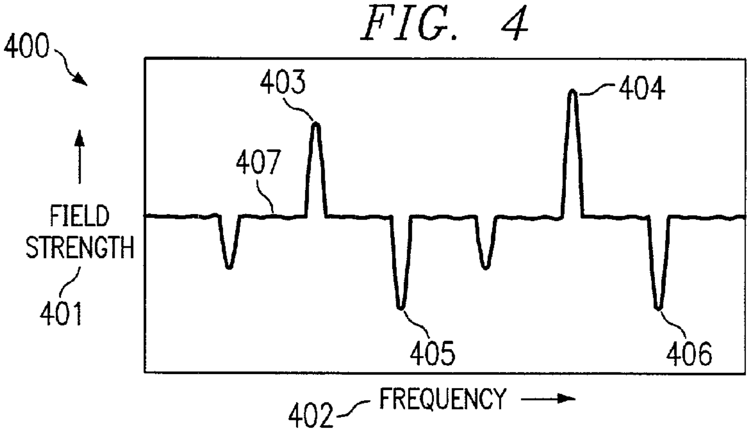
FIG. 4 is a graph of field strength versus frequency for energy incoming to a receiver according to a preferred embodiment of the present invention.

For example, with reference to FIG. 4, field strength 401 of a received reflected RF signal energy is plotted against frequency 402. Generally, peaks and/or troughs in the field strength occur at frequencies at which a resonant frequency interacted with a transmission frequency within region of interest 302. For example, in FIG. 4, peaks 403 and 404, as well as troughs 405 and 406, preferably indicate the frequencies at which resonance occurs within region of interest 302. Accordingly, analyzing circuitry 301 and/or computer system 500 preferably operates to associate the frequencies of such peaks and troughs with the objects having antennae resonant at these peak/trough frequencies and indicates the presence of such objects within region of interest 302.

In a preferred embodiment, a broadband signal is transmitted by Tx 201 towards objects to be identified in region of interest 302, and analyzing circuitry 301 then preferably operates to identify frequencies at which the field strength differs substantially from expected baseline field strength 407. Employing this approach, a simple outgoing signal may be continuously transmitted and analysis done on the reflected energy to identify the objects present within region of interest 302.

In an alternative embodiment, Tx 201 could transmit energy within narrow frequency bands to test for the presence of resonant frequencies within one defined frequency band at a time. In this case, the analysis would be fairly simple, preferably employing a binary determination as to whether the reflected energy includes or excludes evidence of the presence of an antenna within region of interest 302 which is resonant within the previously referenced narrow frequency bands. When employing this embodiment, the individual transmissions are preferably maintained within a frequency range narrow enough to encompass only one resonant frequency within region of interest 302.

Figure 5:
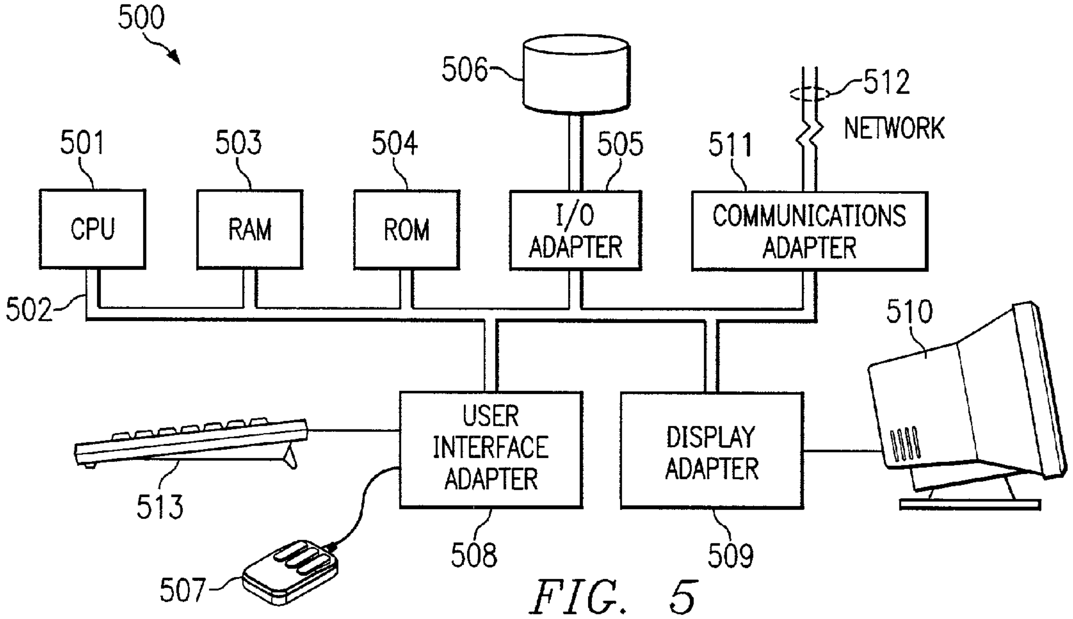
FIG. 5 depicts a computer system adaptable for use with a preferred embodiment of the present invention.

FIG. 5 illustrates computer system 500 adaptable for use with a preferred embodiment of the present invention. Central processing unit (CPU) 501 is coupled to system bus 502. CPU 501 may be any general purpose CPU, such as a Hewlett Packard PA-8200. However, the present invention is not restricted by the architecture of CPU 501 as long as CPU 501 supports the inventive operations as described herein. Bus 502 is coupled to random access memory (RAM) 503, which may be SRAM, DRAM, or SDRAM. ROM 504 is also coupled to Bus 502, which may be PROM, EPROM, or EEPROM. RAM 503 and ROM 504 hold user and system data and programs as is well known in the art.

Bus 502 is also preferably coupled to input/output (I/O) adapter 505, communications adapter card 511, user interface adapter 508, and display adapter 509. I/O adapter 505 connects to storage devices 506, such as one or more of a hard drive, CD drive, floppy disk drive, tape drive, to the computer system. Communications adapter 511 is adapted to couple computer system 500 to Network 512, which may be one or more of a local area network (LAN), wide-area network (WAN), Ethernet or Internet network. User interface adapter 508 couples user input devices, such as keyboard 513 and pointing device 507, to computer system 500. Display adapter 509 is driven by CPU 501 to control the display on display device 510.

What is claimed is:

1. A container comprising:

object presence detection equipment internal to said container, said equipment comprising at least one transmitter of transmitted signal energy and a plurality of fixed receivers of received signal energy;

a set of objects for object presence detection internal to said container, such that an object of said set of objects is operable to modify said transmitted signal energy of a selected frequency to generate said received signal energy of said selected frequency, wherein said set of objects is disposed in a configuration selected from a linear array, a two-dimensional array, and a three-dimensional array; and a container wall substantially surrounding said object presence detection equipment and said set of objects, said wall operable to shield said equipment and said set of objects from extraneous external signals.

2. The container of claim 1 wherein said set of objects comprises a tape cartridge.

3. The container of claim 1 wherein said set of objects comprises a plurality of arrays of objects.

4. The container of claim 3 wherein each array of said plurality of arrays of objects has associated transmitters, receivers, analyzing circuitry, and data processing equipment.

5. The container of claim 1 wherein said transmitted and said received signal energy are selected from electromagnetic radio-frequency energy, sonic energy, and ultrasonic energy.

6. The container of claim 5 wherein said object is operable to modify said transmitted signal energy of a selected frequency by resonating at said frequency.

7. The container of claim 6 wherein said resonating is enhanced by variable resonant material characteristics selected from length, width, thickness, material composition, electrical resistance, electrical excitation, application of tensile force, application of compressive force, temperature, electrical induction, and electrical capacitance.

8. The container of claim 6 wherein objects in a subset of said objects within said set of objects are interchangeable and resonate at the same frequency.

9. The container of claim 1 wherein said at least one transmitter and said at least one receiver are combined into at least one transceiver.

10. A tape storage container comprising:

object presence detection equipment internal to said container, said equipment comprising at least one transmitter of transmitted signal energy and at least one receiver of received signal energy;

a plurality of tape cartridges for object presence detection internal to said container, wherein said plurality of tape cartridges is disposed in a configuration selected from a linear array, a two-dimensional array. and a three-dimensional array, such that a tape cartridge of said plurality of tape cartridges is operable to modify said transmitted signal energy of a selected frequency to generate said received signal energy of said selected frequency; and a metallic outer body substantially surrounding said object presence detection equipment and said plurality of tape cartridges, said metallic outer body operable to shield said equipment and said tape cartridges from extraneous external signals.

11. The container of claim 10 wherein said plurality of tape cartridges comprises a plurality of arrays of objects.

12. The container of claim 11 wherein each array of said plurality of arrays of tape cartridges has associated transmitters, receivers, analyzing circuitry, and data processing equipment.

13. The container of claim 10 wherein said transmitted and said received signal energy are selected from electromagnetic radio-frequency energy, sonic energy, and ultrasonic energy.

14. The container of claim 13 wherein said object is operable to modify said transmitted signal energy of a selected frequency by resonating at said frequency.

15. The container of claim 14 wherein said resonating is enhanced by variable resonant material characteristics selected from length, width, thickness, material composition, electrical resistance, electrical excitation, application of tensile force, application of compressive force, temperature, electrical induction, and electrical capacitance.

16. The container of claim 14 wherein tape cartridges in a subset of said tape cartridges within said plurality of tape cartridges are interchangeable with one another and resonate at the same frequency.

17. The container of claim 10 wherein said at least one transmitter and said at least one receiver are combined into at least one transceiver.

* * * * *

UNITED STATES PATENT AND TRADEMARK OFFICE

CERTIFICATE OF CORRECTION

PATENT NO. : 7,274,285 B2
APPLICATION NO. : 09/912211
DATED : September 25, 2007
INVENTOR(S) : Michael J. Chaloner et al.

It is certified that error appears in the above-identified patent and that said Letters Patent is hereby corrected as shown below:

In column 8, line 12, in Claim 10, after “two-dimensional array” delete “.” and insert -- , --, therefor.

Signed and Sealed this

Nineteenth Day of October, 2010

David J. Kappos
*Director of the United States Patent and Trademark Office*